United States Patent [19]

Kleyer et al.

[11] Patent Number: 6,017,587
[45] Date of Patent: Jan. 25, 2000

[54] ELECTRICALLY CONDUCTIVE SILICONE COMPOSITIONS

[75] Inventors: Don Lee Kleyer, Hemlock; Michael Andrew Lutz, Hope, both of Mich.; Katsutoshi Mine, Chiba Prefecture, Japan; Osamu Mitani, Chiba Prefecture, Japan; Kazumi Nakayoshi, Chiba Prefecture, Japan; Bernard Vanwert, Midland, Mich.

[73] Assignees: Dow Corning Corporation, Midland, Mich.; Dow Corning Toray Silicone Co., Ltd., Tokyo, Japan

[21] Appl. No.: 09/112,392

[22] Filed: Jul. 9, 1998

[51] Int. Cl.[7] .................................................... B05D 3/02
[52] U.S. Cl. .......................... 427/387; 428/447; 524/46; 524/100; 524/267; 524/315; 524/306; 524/484; 524/440; 525/478; 525/479
[58] Field of Search ..................... 525/478, 479; 524/440, 46, 100, 267, 315, 306, 484; 427/387; 428/447

[56] References Cited

U.S. PATENT DOCUMENTS

| | | |
|---|---|---|
| 3,419,593 | 12/1968 | Willing . |
| 3,609,104 | 9/1971 | Ehrreich et al. . |
| 4,087,585 | 5/1978 | Schulz . |
| 4,659,851 | 4/1987 | Plueddemann . |
| 4,761,454 | 8/1988 | Oba et al. . |
| 4,766,176 | 8/1988 | Lee et al. . |
| 5,082,596 | 1/1992 | Fukuda et al. . |
| 5,153,160 | 10/1992 | Saruyama et al. . |
| 5,227,093 | 7/1993 | Cole et al. . |
| 5,229,037 | 7/1993 | Nakano et al. . |
| 5,371,139 | 12/1994 | Yokoyama et al. . |
| 5,424,384 | 6/1995 | Gentle et al. . |
| 5,580,915 | 12/1996 | Lin ............................................ 525/478 |
| 5,700,870 | 12/1997 | Mueller et al. .......................... 525/478 |

FOREIGN PATENT DOCUMENTS

| | | |
|---|---|---|
| 59-96122 | of 1984 | Japan . |
| 61-108661 | 5/1986 | Japan . |
| 5-314812 | 11/1993 | Japan . |

*Primary Examiner*—Melvyn I. Marquis
*Attorney, Agent, or Firm*—Timothy J. Troy

[57] ABSTRACT

The present invention relates to electrically conductive silicone compositions comprising an organopolysiloxane containing at least two alkenyl groups per molecule, an organohydrogenpolysiloxane having at least two silicon-bonded hydrogen atoms per molecule, a platinum group metal containing catalyst, a conductive metal particulate, a precrosslinked elastomeric silicone particle, and a non-reactive volatile diluent. The electrically conductive silicone compositions of this invention are useful as electrically conductive adhesives and coatings for electrical and electronic devices. The cured electrically conductive silicone compositions of this invention have high electroconductivity and rubbery elasticity.

29 Claims, No Drawings

ELECTRICALLY CONDUCTIVE SILICONE COMPOSITIONS

FIELD OF THE INVENTION

The present invention relates to electrically conductive silicone compositions comprising an organopolysiloxane containing at least two alkenyl groups per molecule, an organohydrogenpolysiloxane having at least two silicon-bonded hydrogen atoms per molecule, a platinum group metal containing catalyst, conductive metal particulates, precrosslinked elastomeric silicone particles, and a non-reactive volatile diluent

BACKGROUND OF THE INVENTION

Electrically conductive silicone compositions have been described in the art. For example, Ehrreich et al., in U.S. Pat. No. 3,609,104 discloses a method of making an electrically conductive plastic article, the method comprising providing a first mixture of pressure distortable, cured thermosetting resin particles and an uncured thermosetting resin, providing a second mixture comprising the first mixture and metallic particles sufficient in quantity to provide electrical conductivity in said article, applying pressure to said second mixture thereby to distort said cured particles and reduce the interstices between them, curing said uncured resin while said second mixture is under pressure, and forming said article from said second mixture. Ehrreich et al. further disclose that the cure particles can be of a silicone resin, that the uncured resin can be a silicone resin, and that the cure particles can be particles of the pressure-distortable silicone foam.

Japanese Patent Application Laid-Open No. 61-108661 (108,661/1986) discloses an electrically conductive silicone rubber composition obtained by blending an already vulcanized silicone rubber particulate into a carbon black-loaded silicone rubber base, where the silicone rubber base may be composed of an organopolysiloxane which contains substituted or unsubstituted monovalent hydrocarbon groups such as alkyl groups exemplified by methyl, or alkenyl groups exemplified by vinyl or allyl. J'661 also discloses that the already vulcanized silicone rubber particulate may be afforded by addition reaction upon heating in the presence of a platinum catalyst.

Japanese Patent Application Laid-Open No. 5-314812 (314,812/1993) discloses an electrically conductive resin paste that contains modified bisphenol A diglycidyl ether epoxy resin that is modified with carboxyl-terminated butadiene-nitrile copolymer rubber or amino-terminated butadiene-nitrile copolymer rubber, addition reaction-type silicone resin, silver powder, a curing agent, a curing accelerator, and a solvent which can be a reactive diluent, a non-reactive diluent, or a plasticizer.

Fukuda et al. in U.S. Pat. No. 5,082,596 discloses an electroconductive silicone rubber composition comprising a uniform blend of a diorganopolysiloxane containing alkyl groups, cycloalkyl groups, alkenyl groups, or aryl groups, a cured silicone rubber in the form of a powder of which the particles have a spherical configuration, carbon black in an amount sufficient to impart electroconductivity to the composition, and a curing agent.

Nakano et al. in U.S. Pat. No. 5,229,037 discloses electroconductive silicone rubber compositions which comprises as a blend a diorganopolysiloxane containing alkyl groups, cycloalkyl groups, alkenyl groups, or aryl groups, spherical particles of a cured silicone elastomer, a metallic electroconductivity-imparting agent, and a curing agent of a silicone rubber in an amount sufficient to cure the composition. Nakano et al. also discloses that the silicone rubber composition may further comprise up to 20 parts by weight of a liquid organosilicon compound.

SUMMARY OF THE INVENTION

The present invention relates to electrically conductive silicone compositions comprising an organopolysiloxane containing at least two alkenyl groups per molecule, an organohydrogenpolysiloxane having at least two silicon-bonded hydrogen atoms per molecule, a platinum group metal containing catalyst, a conductive metal particulate, a precrosslinked elastomeric silicone particle, and a non-reactive volatile diluent.

It is an object of this invention to produce an electrically conductive silicone composition having reduced volume resistivity.

It is also an object of this invention to produce an electrically conductive silicone composition having a rubbery elasticity.

It is a further object of this invention to produce an electrically conductive silicone composition which can be subsequently cured into an adhesive for use on electronic devices.

DETAILED DESCRIPTION OF THE INVENTION

The present invention relates to electrically conductive silicone compositions comprising (A) at least one organopolysiloxane containing at least two alkenyl groups per molecule, (B) at least one organohydrogenpolysiloxane having at least two silicon-bonded hydrogen atoms per molecule, (C) a platinum group metal-containing catalyst, (D) at least one conductive metal particulate, (E) precrosslinked elastomeric silicone particles, and (F) at least one non-reactive volatile compatible diluent.

Component (A) in the compositions of this invention is at least one organopolysiloxane containing at least two alkenyl groups per molecule. The viscosity of (A) can range from a pourable liquid to a gum that will not flow under the influence of gravity. Component (A) typically contains from 1.8 to 2.2 hydrocarbon radicals per silicon atom if the final product is in the form of a gel or elastomer, and if a higher level of crosslinking is desired in the final cured product, there will typically be about 1.5 hydrocarbon radical per silicon atom. The organopolysiloxanes of Component (A) contain $R_3SiO_{1/2}$ units and $R_2SiO_{2/2}$ units and can optionally contain $RSiO_{3/2}$ units. The group R is independently selected from a monovalent hydrocarbon or halohydrocarbon radical free of aliphatic unsaturation or an alkenyl group. The monovalent hydrocarbon radicals are exemplified by alkyl groups such as methyl, ethyl, propyl, butyl, hexyl, octyl, and decyl, cycloaliphatic radicals such as cyclohexyl, aryl radicals such as phenyl, tolyl, and xylyl, and aralkyl radicals such as benzyl and phenylethyl. The alkenyl group is exemplified by vinyl, allyl, or 5-hexenyl. Preferably at least 50 percent of the organic groups present in (A) are methyl, and any remainder are phenyl or alkenyl.

Component (A) is exemplified by trimethylsiloxy-terminated dimethylpolysiloxane-methylvinylpolysiloxane copolymers, vinyldimethylsiloxy-terminated dimethylpolysiloxanes, vinyldimethylsiloxy-terminated dimethylpolysiloxane-methylvinylpolysiloxane copolymers, trimethylsiloxy-terminated dimethylpolysiloxane-methylhexenylpolysiloxane copolymers, hexenyldimethylsiloxy-terminated dimethylpolysiloxanes, hexenyldimethylsiloxy-terminated dimethylpolysiloxane-methylhexenylpolysiloxane copolymers, trimethylsiloxy-terminated dimethylsiloxane-methylvinylsiloxane-methylphenylsiloxane copolymers, vinyldimethylsiloxy-terrninated dimethylsiloxane-methylvinylsiloxane-methylphenylsiloxane copolymers, vinyldimethylsiloxy-terminated dimethylsiloxane-methylphenylsiloxane copolymers, vinyldimethylsiloxy-terminated dimethylsiloxane-diphenylsiloxane copolymers, trimethylsiloxy-terminated dimethylsiloxane-methylvinylsiloxane-diphenylsiloxane copolymers, trimethylsiloxy-terminated dimethylsiloxane-methylhexenylsiloxane-methylphenylsiloxane copolymers, hexenyldimethylsiloxy-terminated dimethylsiloxane-methylhexenylsiloxane-methylphenylsiloxane copolymers, hexenyldimethylsiloxy-terminated dimethylsiloxane-methylphenylsiloxane copolymers, hexenyldimethylsiloxy-terminated dimethylsiloxane-diphenylsiloxane copolymers, trimethylsiloxy-terminated dimethylsiloxane-methylhexenylsiloxane-diphenylsiloxane copolymers, and combinations thereof.

The organopolysiloxane of Component (A) preferably has a viscosity at 25° C. of at least 40 millipascal-seconds (mPa·s) (1 mPa·s=1 centipoise (cP)). Component (A) can have an ultrahigh viscosity similar to a state of raw rubber. If the viscosity is less than 40 mPa·s, the composition may be difficult to dispense onto a substrate. Preferably the viscosity of Component (A) is from 200 to 100,000 mPa·s at 25° C., and it is highly preferred that the viscosity of Component (A) is from 400 to 10,000 mPa·s at 25° C.

The alkenyl functional organopolysiloxanes of Component (A) are well known in the art, many of these being available commercially, and further description thereof is considered unnecessary.

Component (B) is at least one organohydrogenpolysiloxane having at least two silicon-bonded hydrogen atoms per molecule. Component (B) is preferably an organohydrogenpolysiloxane compound which is free of aliphatic unsaturation and contains two or more silicon atoms linked by divalent radicals, an average of from one to two silicon-bonded monovalent radicals per silicon atom and an average of at least two silicon-bonded hydrogen atoms per compound. Preferably the organohydrogensiloxane (B) contains an average of three or more silicon-bonded hydrogen atoms such as, for example 3, 5, 10, 20, 40, 70, 100, or more. The organohydrogensiloxane compounds suitable as Component (B) can linear, branched, resinous, or cyclic, however preferably they are linear.

Component (B) is exemplified by dimethylhydrogensiloxy-terminated dimethylpolysiloxanes, dimethylhydrogensiloxy-terminated methylhydrogenpolysiloxanes, dimethylhydrogensiloxy-terminated dimethylpolysiloxane-methylhydrogenpolysiloxane copolymers, trimethylsiloxy-terminated dimethylpolysiloxane-methylhydrogenpolysiloxane copolymers, trimethylsiloxy-terminated methylhydrogenpolysiloxanes, $PrSi(OSiMe_2H)_3$, cyclic methylhydrogensiloxanes, siloxane resin copolymers consisting essentially of $Me_2HSiO_{1/2}$ units and $SiO_2$ units, and combinations thereof. The viscosity at 25° C. of Component (B) is generally from 1 to 2000 mPa·s, and is preferably from 5 to 45 mPa·s.

The linear organohydrogenpolysiloxanes of Component (B) are well known in the art, many of these being available commercially, and further description thereof is considered unnecessary.

The amount of Components (A) and (B) that is used in the compositions of this invention is not narrowly limited. The amounts, expressed in terms of the ratio of the number of silicon-bonded hydrogen atoms of Component (B) to the number of silicon-bonded alkenyl groups of Component (A), should be sufficient to provide a ratio of at least ¼ to $^{100}/_1$, preferably from ½ to $^{20}/_1$, and most preferably from ½ to $^{5}/_1$.

Component (C) in the compositions of this invention is any platinum group metal-containing catalyst Component which facilitates the reaction of silicon-bonded hydrogen atoms with silicon-bonded alkenyl radicals. By platinum group it is meant herein ruthenium, rhodium, palladium, osmium, iridium and platinum.

The platinum group metal-containing catalyst is preferably a platinum containing catalyst component since they are the most widely used and available and because they provide a more favorable effect for the compositions of this invention in terms of improved reaction rates. Platinum-containing catalysts can be a compound or complex of a platinum metal. Preferred platinum-containing catalysts include chloroplatinic acid, alcohol modified chloroplatinic acids, and olefin complexes of platinum.

One type of preferred platinum-containing catalyst Component in the compositions of this invention is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems. These platinum catalysts are well known in the art, many of these being available commercially, and further description thereof is considered unnecessary.

Also suitable as Component (C) are microencapsulated platinum containing catalysts. Microencapsulated platinum-containing catalysts suitable as Component (C) are taught in U.S. Pat. No. 4,766,176 to Lee et al., incorporated herein by reference to teach microencapsulated platinum-containing catalysts which are suitable as Component (C) and a method for their preparation. These platinum-containing catalysts are in the form of microcapsules which comprise a platinum catalyst, as described above, as finely divided particles or droplets that are enveloped within one or two layers of a thermoplastic polymer. The average diameter of the microcapsules is less than 500 microns, and the thermoplastic polymer constitutes at least 50 percent of the weight of the microcapsules. The platinum catalysts which can be microencapsulated are exemplified by chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, and platinum black.

The encapsulated platinum-containing catalyst can be a liquid or solid at ambient temperature. Solid catalysts can be encapsulated in this form or dissolved in a solvent that will not dissolve the encapsulating polymer(s). To increase the density of the microcapsule the catalyst composition can be prepared by treating a finely divided solid such as silica or quartz with one of the above platinum-containing catalysts in liquid or solubilized form.

The particles or droplets of platinum-containing catalyst composition are enveloped within at least one thermoplastic polymer. The catalyst composition can be distributed throughout the volume of the microcapsule or can be concentrated in one or more of the "core" areas.

Polymers useful as encapsulants for the platinum-containing catalysts are exemplified by addition-type polymers such as polyethylene, polystyrene, polyvinyl chloride, polyvinylidene chloride, copolymers of vinyl chloride and vinylidene chloride, polyacrylates such as polymethyl methacrylate, polyacrylonitrile, copolymers of acrylonitrile with butadiene and/or styrene, condensation type polymers such as polyamides and polyesters, cellulose esters such as cellulose acetate, mixed esters such as cellulose acetate butyrate, and phenyl-substituted siloxane resins.

In order for the microencapsulated platinum catalysts to function effectively in the electrically conductive silicone compositions of this invention, the catalyst must be able to penetrate the encapsulating polymer at the desired curing temperature of the electrically conductive silicone composition.

The microcapsules are essentially spherical in shape with diameters of up to 500 microns. Diameters of less than 50 microns are preferred because they are more readily incorporated into the electrically conductive silicone compositions of this invention. Depending on the method used to prepare the microcapsules, they can deviate from this shape at one or more locations around their perimeter, particularly if the encapsulated material is a solid particle such as quartz that was treated with a liquid or solubilized catalyst composition prior to being encapsulated.

The thermoplastic organic polymer(s) that encapsulate the platinum-containing catalyst may be deposited using any of the chemical, physico-chemical, or physical method known in the art. The reader is referred to U.S. Pat. No. 4,766,176 to Lee et al., incorporated herein by reference also to teach methods of encapsulating the platinum-containing catalyst. U.S. Pat. No. 4,766,176 lists examples of suitable chemical, physico-chemical, and physical methods for encapsulating the platinum-containing catalyst.

Another type of encapsulated platinum group catalyst suitable as Component (C) are microparticles of a thermoplastic resin containing an encapsulated hydrosilylation reaction catalyst obtained by a method comprising (i) dissolving a hydrosilylation catalyst and a thermoplastic resin in a quantity of a volatilizable liquid sufficient to achieve a solution exhibiting a viscosity suitable for spraying, where the softening point or glass-transition temperature of the resin is from 40 to 200° C., (ii) blending the solution in the form of a spray into a current of a heated inert gas, whereby the liquid is volatilized from the individual droplets that constitute the spray concurrently with solidification of the resin to form discrete microparticles during entrainment of the droplets in the current, and (iii) recovering the microparticles which are taught by Saruyama et al. in U.S. Pat. No. 5,153,160, incorporated herein by reference to teach encapsulated platinum group catalysts suitable as Component (C) of this invention.

Hydrosilylation catalysts suitable for use in the method of Saruyama et al. are exemplified by platinum containing catalysts such as chloroplatinic acid, alcohol-modified chloroplatinic acid, platinum-olefin complexes, chloroplatinic acid-diketone complexes, complexes of vinylsiloxane and platinum or chioroplatinic acid, platinum black, platinum supported on alumina, silica and carbon black, palladium catalysts such as tetrakis(triphenylphosphine)palladium, and complex catalysts of rhodium, nickel, and cobalt.

Thermoplastic resins suitable for use in the method of Saruyama et al. are exemplified by silicone resins, polysilane resins, acrylic resins, polystyrene resins, and methyl cellulose, with silicone resins and acrylic resins being preferred.

The amount of platinum group metal-containing catalyst Component (C) is used is not narrowly limited as long as there is a sufficient amount to accelerate a room temperature reaction between organohydrogenpolysiloxane (B) and alkenyl organopolysiloxane (A) and not so much as to make its action uncontrollable by the use of an inhibitor. The exact necessary amount of this catalyst Component will depend on the particular catalyst utilized and is not easily predictable. However, for platinum-containing catalysts the amount can be as low as one part by weight of platinum for every one million parts by weight of Component (A). However, generally the catalyst is added in an amount from 1 to 2000 parts by weight of platinum for every one million parts of (A)+(B), and it is preferred that the amount is from 5 to 1000 parts by weight of platinum for every one million parts by weight of (A)+(B).

Component (D) in the electrically conductive silicone compositions of this invention is at least one conductive metal particulate. The conductive metal particulate is in a finely divided form such as powders, fibers, or flakes of a metal such as nickel, copper, silver, or gold, or a finely divided composite form of an inorganic material such as particles and fibers of glass, mica, and alumina plated with a metal such as nickel, silver, and gold.

The conductive metal particulate of this invention is preferably any silver-containing particulate. This silver-containing particulate is exemplified by silver particles which may be in the form of solid silver particles, silver coated glass beads, and silver coated fibers. Preferably the conductive metal particulate is a solid silver particle since they typically provide higher electrical conductivity than an equal volume of silver coated particulates such as glass beads and fibers, the solid particles are usually preferred when it is desired to maximize electrical conductivity. Finely divided solid silver particles are preferred and are available as a spherical powder and in flake form. Because the interparticle contact area of flakes is typically higher than that of powders, flakes are preferred in some applications. Commercially available forms of silver flake typically contain a coating of a fatty acid as a processing aid. Spherical silver particles without any coating are commercially available, but these are difficult to disperse in curable organosiloxane compositions at the concentrations required to achieve volume resistivity values less than 1 milliohm-cm following heat aging of the cured sample at temperatures of about 150° C. for at least two days. It is highly preferred that Component (D) is a silver flake which has been treated with an ester of a fatty acid prior to its incorporation into the electrically conductive silicone compositions of this invention as is disclosed in U.S. Pat. No. 5,227,093 incorporated herein by reference to teach silver flakes suitable for use in the electrically conductive silicone compositions of this invention. The esterified fatty acids that can be applied to the finely divided silver particles are typically derived from saturated or ethylenically unsaturated carboxylic acids containing from 10 to 20 or more carbon atoms and alcohols containing from 1 to about 10 carbon atoms and at least one hydroxyl group. Suitable carboxylic acids are exemplified by decanoic, dodecanoic, decenoic, stearic, palmitic, linoleic, and oleic acids. The alcohol portion of the ester can be derived for example, from methyl, ethyl, n-propyl, isopropyl, or any of the isomeric butyl, hexyl, cyclohexyl, octyl, or decyl alcohols. The methyl esters are particularly preferred.

The silver coated particles of Component (D) contain a surface layer of silver on a conductive or non-conductive substrate. Suitable substrates are exemplified by metals such as copper, aluminum, and non-metallic materials such as glass and organic polymers. Particulate forms of solid silver are typically obtained from the chemical or electrochemical reduction of a silver compound such as silver nitrate. When finely divided silver particles are used as conductive metal particulate (D), the particles can be essentially spherical or elongated. It is preferred however, that the particles of silver powder have been processed in a ball mill or similar device to form flakes. Mixtures of two or more different types of conductive metal particulates are also suitable as Component (D) and are exemplified by a mixture of silver powder and silver flake.

To provide a low level of volume resistivity, one means for expressing electrical conductivity, the volume resistivity of the metal particles of (D) should preferably be less than 0.2 milliohm-cm. Volume resistivity (Rv), typically expressed in ohm-cm, is calculated using the formula $Rv=R((w)(t)/l)$, where R is the electrical resistance of the sample in ohms measured using an ohmmeter or equivalent resistance measuring device, w and t are the width and thickness of the sample, in centimeters, and 1 is the distance in centimeters between the electrical conductors of the resistance measuring device.

To achieve maximum electrical conductivity, the diameter of the conductive metal particles of Component (D) is preferably in the range from 0.5 to about 100 micrometers.

To achieve the highest electrical conductivity in these materials, the concentration of conductive metal particles in the compositions of this invention should be the maximum that will allow the composition to be prepared and processed in the desired manner. The conductive metal particulate, Component (D), is generally present in an amount from 200 to 600 parts by weight per 100 parts by weight of (A)+(B), and preferably from 300 to 550 parts by weight per 100 parts by weight of (A)+(B).

Component (E) in the compositions of this invention comprises precrosslinked elastomeric silicone particles. This Component can be a powder of a precrosslinked silicone elastomer consisting of spherical or irregular particles having a range of average particle sizes. This Component serves to improve the molding workability of the compositions of this invention, provides the cured compositions of this invention with good rubbery elasticity with a low hardness and the ability to exhibit a very low permanent compression set. The Component also enables the compositions of this invention to have high electroconductivity without employing excessive amounts of the conductive metal particulate, Component (D).

Several methods describe the preparation of spherical particles of precrosslinked silicone elastomer such as the method disclosed in Japanese Patent Application No. 59-96122 which teaches a curable organopolysiloxane composition which is sprayed and cured in a spray drier at a temperature in the range from 230 to 300° C. U.S. Pat. No. 4,761,454, incorporated herein by reference to teach precrosslinked elastomeric silicone particles suitable as Component (E), discloses fine spherical particles of a silicone elastomer obtained by a method comprising spray drying an aqueous emulsion containing a curable organopolysiloxane composition wherein the aqueous emulsion containing the curable organopolysiloxane composition is obtained by a method comprising mixing an organopolysiloxane having at least two silicon-bonded vinyl groups per molecule and an organohydrogenpolysiloxane having at least two silicon-bonded hydrogen atoms per molecule to give an organopolysiloxane composition, dispersing the organopolysiloxane composition in an aqueous medium containing a surface active agent to give an aqueous emulsion, of which the particle diameter of the dispersed organopolysiloxane composition is 20 microns or smaller, and admixing the aqueous emulsion with a platinum compound in a catalytic amount.

Component (E) can also be prepared from a silicone rubber microsuspension as described in U.S. Pat. No. 5,371,139, incorporated herein by reference to teach materials suitable for use as Component (E) in the electrically conductive silicone compositions of this invention. U.S. Pat. No. 5,371,139 teaches a silicone rubber microsuspension which comprises (i) a microparticulate silicone rubber having an average particle diameter not exceeding 10 micrometers, which is exemplified by liquid silicone rubber compositions which comprise an organopolysiloxane having at least two silicon-bonded lower alkenyl groups, exemplified by vinyl, per molecule, an organohydrogenpolysiloxane having at least two silicone bonded hydrogen atoms per molecule, a platinum catalyst, and optionally an epoxy group-containing compound or an aryl group-containing compound, (ii) a nonionic surfactant having an HLB value of less than 10 exemplified by polyoxyethylene nonylphenyl ethers, polyoxyethylene trimethylnonyl ethers, and polyoxyethylene sorbitan stearate esters, (iii) a nonionic surfactant having an HLB value of at least 10 exemplified by polyoxyethylene octylphenyl ethers, polyoxyethylene trimethylnonyl ethers, and polyoxyethylene sorbitan stearate esters, and (iv) water with the proviso that Component (i) comprises at least 50 weight percent of the total composition. It is further disclosed by U.S. Pat. No. 5,371,139 that the silicone rubber microsuspension is prepared by (I) mixing Components (i)–(iv) above, (II) forming an emulsion of the liquid silicone rubber composition, and (III) curing the emulsion of the liquid silicone rubber composition.

Particles prepared by crushing precrosslinked silicone elastomers are also suitable as Component (E). The precrosslinked silicone elastomers are exemplified by silicone elastomers which are prepared by curing alkenyl groups by the thermal decomposition of peroxides, silicone elastomers prepared by reacting compounds containing silicon-bonded alkenyl groups such as vinyl groups with compounds containing silicon-bonded hydrogen atoms in the presence of a platinum-group containing metal catalyst (i.e. an addition reaction), and silicone elastomers prepared by exposing compounds containing moisture sensitive groups to atmospheric humidity (i.e. a condensation reaction). However, it is preferred to use silicone elastomers prepared by an addition reaction as described above. The precrosslinked silicone elastomers are then converted into crushed or pulverized particles of precrosslinked silicone elastomer using any suitable pulverizing or crushing means known in the art. The elastomers can be crushed or pulverized, for example, by a hammer mill.

The particles of the precrosslinked silicone elastomer (E) should have an average particle size of from 0.1 to 500 microns, and preferably from 0.5 to 300 microns.

The amount of precrosslinked elastomeric silicone particles, Component (E), generally ranges from 10 to 150 parts by weight per 100 parts by weight of (A)+(B), and preferably from 15 to 80 parts by weight per 100 parts by weight of (A)+(B).

Component (F) in the compositions of this invention is at least one volatile, non-reactive, compatible diluent. Herein "volatile" means it can be substantially removed from the composition under cure conditions with the proviso that it is not so volatile so as to be removed before the onset of cure. Herein "non-reactive" means it does not contain functionality which would enable it to chemically react with the other Components of the composition. Herein "compatible" means it dissolves in the composition and is non-interfering with cure. Examples of non-compatible materials would be amine and thiol functionalities which may inhibit the cure of the composition by complexation with the platinum catalyst. Another example of non-compatible materials would be those materials too polar to dissolve in the silicone matrix such as butyrolactone and N, N-dimethylacetamide.

Component (F) is exemplified by cyclic saturated hydrocarbons, straight-chain saturated hydrocarbons exemplified by n-hexadecane, n-decane, n-pentadecane, and cyclohexyldecane, isoparaffins exemplified by Isosol® 400K (a light liquid isoparrafin solvent having a boiling point ranging from 206° to 257° C. available from Nippon Sekiyu K.K. Chem. Co. Ltd.) or Isopar® G (a light liquid C10–11 isoparrafin solvent having a boiling point ranging from 157° to 176° C. available from Exxon Corporation), mineral oils such as Ervol® (a white mineral oil having a viscosity of 24 to 26 $mm^2/s$ (1 $mm^2/s$=1 centistoke) at 40° C. available from Witco Chemical Corporation, Sonneborn Division, Melrose Park, Ill. 60160) or Drakeol® 21 (a mineral oil available from Penreco Corp. of Butler, Pa.). Also suitable as Component (F) are aromatic hydrocarbons and alkyl substituted aromatic hydrocarbons where the alkyl substituent can be either straight chain, branched or cyclic exemplified by xylene, pentylbenzene, and cyclohexylbenzene. Component (F) can also be an ether where the substituents on either side of the oxygen radical can be branched saturated hydrocarbons, cyclic saturated hydrocarbons, straight-chain saturated hydrocarbon, aromatic hydrocarbons, or alkyl substituted aromatic hydrocarbons, and the ethers are exemplified by dioctyl ether and dihexyl ether. Component (F) can also be an ester where the substituents can be branched saturated hydrocarbons, cyclic saturated hydrocarbons, straight-chain saturated hydrocarbon, aromatic hydrocarbons, or alkyl substituted aromatic hydrocarbons, and the esters are exemplified by diethyl phthalate, diethylhexyl phthalate, and butyl decanoate.

Linear low molecular weight polysiloxanes or cyclic low molecular weight polysiloxanes are also suitable as Component (F). These polysiloxanes are exemplified by dodecamethylcyclohexasiloxane, octamethylcyclotetrasiloxane, 1,1,1,2,2,3,3,4,4,5,5,6,6,6-tetradecylhexasiloxane, 1,1,1,2,3,3,3-heptamethyl-2-styryltrisiloxane, 1,1,1,2,3,3,3-heptamethyl-2-phenyltrisiloxane, or 1,1,1,2,3,3,3-heptamethyl-2-octyltrisiloxane. Mixtures of two or more of any of the above described diluents (F) can also be used.

Preferably, Component (F) is selected from the group consisting of hexadecane, mineral oil, isoparaffins, decamethylcyclopentasiloxane, dodecamethylcyclohexasiloxane, xylene, pentylbenzene, cyclohexylbenzene, diethyl phthalate, decane, pentadecane, and a mixture of decamethylcyclopentasiloxane and dodecamethylcyclohexasiloxane. The amount of volatile non-reactive compatible diluent Component (F), generally ranges from 1 to 150 parts by weight per 100 parts by weight of (A)+(B), and preferably from 10 to 50 parts by weight per 100 parts by weight of (A)+(B).

The compositions of this invention can further comprise a siloxane resin consisting essentially of at least one $R_3SiO_{1/2}$ (M) unit and at least one $SiO_{4/2}$ (Q) unit wherein R is independently selected from the group consisting of a monovalent hydrocarbon group free of aliphatic unsaturation having from 1 to 10 carbon atoms and an alkenyl group having from 2 to 10 carbon atoms. Monovalent hydrocarbon radicals free of aliphatic unsaturation are exemplified by alkyl radicals such as methyl, ethyl, propyl, butyl, hexyl, octyl, and decyl, cycloaliphatic radicals such as cyclohexyl, aryl radicals such as phenyl, tolyl, and xylyl, and aralkyl radicals such as benzyl and phenylethyl. Highly preferred monovalent hydrocarbon radicals for R are methyl and phenyl. The alkenyl groups are exemplified by vinyl, allyl, hexenyl, octenyl, and decenyl. Preferably, the siloxane resin is selected from the group consisting of a siloxane resin consisting essentially of $Me_3SiO_{1/2}$ (M) and $SiO_{4/2}$ (Q) units, a siloxane resin consisting essentially of $Me_2ViSiO_{1/2}$ (M) and $SiO_{4/2}$ (Q) units, and a siloxane resin consisting essentially of $Me_3SiO_{1/2}$ (M), $Me_2ViSiO_{1/2}$ (M), and $SiO_{4/2}$ (Q) units, wherein Me denotes methyl, Vi denotes vinyl, and the molar ratio of M to Q units is from 0.6:1 to 1.9:1.

Generally from 0 to 100 parts by weight per 100 parts by weight of (A)+(B) of siloxane resin is used, and preferably from 0 to 55 parts by weight of siloxane resin be employed per 100 parts by weight of (A)+(B).

The compositions of this invention can further comprise an inhibitor. The inhibitor can be any material that is known to be, or can be, used to inhibit the catalytic activity of platinum group metal-containing catalysts. By the term "inhibitor" it is meant herein a material that retards the room temperature curing of a curable mixture of an alkenyl polydiorganosiloxane, an organohydrogensiloxane and a platinum catalyst, when incorporated therein in small amounts, such as less than 10 parts by weight of the composition, without preventing the elevated temperature curing of the mixture. Examples of suitable inhibitors include ethylenically or aromatically unsaturated amides, acetylenic compounds including acetylenic alcohols and silylated acetylenic alcohols, ethylenically unsaturated isocyanates, olefinic siloxanes, unsaturated hydrocarbon diesters, conjugated ene-ynes, olefinic cyclosiloxanes, hydroperoxides, nitriles, and diaziridines.

Preferred inhibitors are exemplified by acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-(methoxyisopropyl) maleate, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above.

The amount of inhibitor to be used in the electrically conductive silicone compositions of this invention is not critical and can be any amount that will retard the reaction between Components (A) and (B) initiated by the presence of catalyst (C) while not preventing this reaction at elevated temperatures. No specific amount of inhibitor can be suggested to obtain a specified pot life at room temperature since the desired amount of any particular inhibitor will depend on the type of platinum group metal-containing catalyst (C) which is used, the nature and amounts of ingredients (A), (B), (D), (E), and (F), and the presence or absence of optional ingredients. For example, if an encapsulated platinum group metal-containing catalyst is used, a sufficient amount of inhibitor to complex any fugitive platinum may be extremely low, for example a molar ratio of inhibitor to platinum of less than 3, however if a platinum complex is used then a sufficient amount of inhibitor would be much larger, for example a molar ratio of inhibitor to platinum of about 100. The affinity of a particular inhibitor for platinum also has to be considered when selecting a molar ratio of inhibitor to platinum and can be determined by routine experimentation.

The electrically conductive silicone compositions of this invention can further comprise additional ingredients to improve the processability of the compositions or the properties of cured materials prepared from these compositions. Typical additional ingredients are exemplified by reinforcing fillers exemplified by precipitated silica and fumed silica, the silica preferably being hydrophobic, non-reinforcing fillers exemplified by ground quartz and titanium dioxide, filler treating agents, adhesion promoters, flame retarding agents, heat stabilizers, pigments, and dyes. The adhesion promoters are exemplified by $ViMe_2SiO(Me_2SiO)_3Si(OMe)_3$, epoxy silanes exemplified by gamma-glycidoxypropyltrimethoxysilane, a combination of an epoxysilane such as gamma-glycidoxypropyltrimethoxysilane and a polysiloxane having an average of at least one silicon-bonded hydroxyl radical per molecule and an average of at least one silicon-bonded vinyl radical per molecule exemplified by hydroxyl-endblocked polymethylvinylsiloxane which are taught in U.S. Pat. No. 4,087,585 incorporated herein by reference to teach epoxy silane-polysiloxane combinations which are suitable as adhesion promoters in the compositions of this invention, a reaction product of a polyhydric alcohol having the formula $R^1(OH)_n$ and an organosilicon compound selected from the group consisting of silanes having the formula $R^3_m Si(OR^2)_{4-m}$ and bis-silylalkanes having the formula $(R^2O)_3 SiR^4 Si(OR^2)_3$ wherein $R^1$ denotes a substituted or unsubstituted hydrocarbon radical having a valence of n and no ethylenic unsaturation, $OR^2$ is selected from the group consisting of alkoxy groups and enoloxy groups, $R^3$ denotes a substituted or unsubstituted monovalent hydrocarbon radical, $R^4$ denotes an alkylene radical, m has a value of 0 or 1, and n has a value from 2 to 4, inclusive which are taught in U.S. Pat. No. 5,424,384 incorporated herein by reference to teach reaction products which are suitable as adhesion promoters in the compositions of this invention, and silanes and bis-silylhydrocarbons that contain a plurality of silicon-bonded alkoxy groups and at least one substituent that is bonded to silicon through oxygen and contains at least four carbon atoms, two of which form a terminal group having the formula $CH_2=CH-$, exemplified by $CH_2=CH(CH_2)_9 OSi(OEt)_3$ wherein Et denotes ethyl, which are taught in U.S. Pat. No. 4,659,851 incorporated herein by reference to teach silanes and bis-silylhydrocarbons which are suitable as adhesion promoters in the compositions of this invention.

The electrically conductive silicone compositions of this invention are prepared by any suitable means that will produce a homogeneous mixture of the ingredients, particularly the conductive metal particulate. Blending equipment commonly used to prepare silicone compositions is exemplified by blade and paddle mixers and planetary mixers.

The order in which the ingredients are added to the mixer is usually not critical. In a typical preparation, Component (A), the alkenyl containing organopolysiloxane, the organohydrogensiloxane, Component (B), the conductive metal particulates, Component (D), the precrosslinked elastomeric silicone particles (E), and diluent (F) and any optional ingredients are blended to homogeneity, after which the platinum group metal-containing catalyst (C) is added, and the mixing operation is continued at room temperature until a homogeneous composition is produced.

The electrically conductive silicone compositions of this invention are useful as coating materials and as the starting material for preparing elastomeric and rigid shaped articles. Typical applications are exemplified by electrically conductive adhesives and coatings for electrical and electronic devices. The cured electrically conductive silicone compositions of this invention have high electroconductivity and rubbery elasticity as evidenced by its low hardness and low compression set.

The present invention also relates to electrically conductive silicone compositions obtained by a method comprising reacting a mixture comprising (A) at least one organopolysiloxane containing at least two alkenyl groups per molecule, (B) at least one organohydrogenpolysiloxane having at least two silicon-bonded hydrogen atoms per molecule, (C) a platinum group metal-containing catalyst, (D) a conductive metal particulate, (E) a precrosslinked elastomeric silicone particle, and (F) a non-reactive volatile compatible diluent. The mixture can further comprise a siloxane resin, an inhibitor, an adhesion promoter, and any other optional ingredients described above. Components (A)–(F) and the optional ingredients are as described above including amounts and preferred embodiments thereof. "Reacting" for the purposes of this invention denotes simply mixing Components (A)–(F), and any optional Components at room temperature (about 25° C.) or heating a mixture of Components (A)–(F) and any optional Components at temperatures above room temperature, preferably at temperatures above 100° C., and more preferably at temperatures from 100–200° C.

This invention also relates to an article of manufacture obtained by a method comprising (I) applying an electrically conductive silicone composition on the surface of a substrate wherein the electrically conductive silicone composition comprises: Components (A)–(F) and any of the optional ingredients described above. The method can further comprise (II) exposing the coating and the substrate to heat in an amount sufficient to cure the coating. Components (A)–(F) and the optional ingredients are as described above including amounts and preferred embodiments thereof.

EXAMPLES

In the following, the electrically conductive silicone compositions of this invention are illustrated in more detail by way of examples and comparative examples in which, unless otherwise specified, all parts and percentages are by weight.

Viscosity was determined on the uncured composition at 25° C. using a cone and plate viscometer at a shear rate of 1/sec.

In the examples, the particle size was determined by a laser light scattering method using an instrument such as a Leeds & Northrup Microtrac.

With respect to the surface area, apparent density, and tap density of the silver particulates, it is difficult to determine what method was used by the various suppliers of the silver particulates, however, an exemplary method of measuring the surface area of particulates is the Quantachrome Monosorb B.E.T. method, an exemplary method of measuring the apparent density of particulates is described in ASTM B329-85, and an exemplary method of measuring the tap density of particulates is described in ASTM B527-85.

The sieve analysis was conducted in the following manner: the particle size distribution of a material is determined by passing the material through a series of standard sieves with decreasing hold size. The percentage of the material remaining on each sieve and passing through to the next is used as the basis for determination of size distribution.

Young's Modulus was determined in the following manner: tensile bars were cut from drawn down slabs that had been cured for 2 hours at 150° C. with testing at a pull speed of 5 cm/min. This procedure is described in detail in ASTM D412.

The volume resistivity was determined in the following manner: aliquots of the prepared composition were drawn down the surface of glass slides giving strips 0.25 cm wide and then heated in an oven for 1 hour at 150° C. to cure. The strip thickness was adjusted to accommodate the particle size of the precrosslinked elastomeric silicone particles. After curing the strips were approximately 0.005 to 0.03 cm thick. Resistance was determined by measuring the voltage (V) drop along a 2.54 cm strip while passing current (I) through the strip, (R=V/I). The 4 pole method used spring loaded gold plated probes in contact with the strip surface. Six separate strips were prepared and measured for resistance and dimensions. The volume resistivity (Rv) was calculated for each strip using the formula Rv=(R(w)(t)/l) where R is the electrical resistance of the sample in ohms measured using an ohmmeter or equivalent resistance measuring device, w and t are the width and thickness of the sample, in centimeters, and 1 is the distance in centimeters between the electrical conductors of the resistance measuring device. Volume resistivity units are reported in Ohm-cm.

Evaluation of diluent volatility was completed by measuring weight loss for a 1.5 gram aliquot from a 5 cm diameter aluminum dish after heating in a circulated air vented oven held at 150° C. for 20 hours.

Reference Example 1

The following Components were mixed until uniform:
(a) 100 parts by weight of a mixture containing 69 percent by weight of a dimethylvinylsiloxy-terminated dimethylpolysiloxane having a viscosity of 2000 mPa·s and 31 percent by weight of an organosiloxane resin consisting essentially of $Me_3SiO_{1/2}$ units, $Me_2ViSiO_{1/2}$ units, and $SiO_{4/2}$ units having a molar ratio of monovalent units to tetravalent units of 0.7:1, the mixture having a viscosity of 8,000 mPa·s at 25° C. and having a vinyl content of 0.8 percent by weight,
(b) 4.1 parts by weight of $ViMe_2SiO(Me_2SiO)_3Si(OMe)_3$,
(c) 4.1 parts by weight of a mixture containing
   (i) 97 percent by weight of $ViMe_2SiO(Me_2SiO)_3Si(OMe)_3$ and
   (ii) 3 percent by weight of 2-phenyl-3-butyn-2-ol,
(d) 481.4 parts by weight of silver particulates having an average particle size of 6 microns, a surface area of 0.9 $m^2/g$, an apparent density of 2 $g/cm^3$, and a tap density of 3 $g/cm^3$,
(e) 25.2 parts by weight of crushed crosslinked silicone rubber particulates having, by sieve analysis, an average particle size of approximately 25 microns and a maximum particle size of less than 63 microns,
(f) 7.5 parts by weight of a mixture containing (i) 40 percent by weight of a complex of platinum with 1,3-divinyl-1,1,3,3 tetramethyldisiloxane dispersed in a thermoplastic silicone resin having a softening point of from 80–90° C. and reduced to fine particles (ii) 52 percent by weight of a dimethylvinylsiloxy-terminated dimethylpolysiloxane having a viscosity 2000 mPa·s at 25° C. having a vinyl content of 0.2 percent by weight, (iii) 8 percent by weight of hydrophobic silica, the mixture having a platinum content of about 0.9 percent by weight, and
(g) 4.9 parts by weight of trimethylsiloxy-terminated methylhydrogenpolysiloxane having a viscosity 30 mPa·s at 25° C. having a hydrogen content of 1.6 percent by weight.

Reference Example 1 was denoted "Control" in Table 1 hereinbelow. The average and standard deviation for volume resistivity for the composition are listed in Table 1. The viscosity and volume resistivity were measured as described above and the results are reported in Table 1.

Examples 2–7

A variety of diluents were evaluated. Aliquots of the composition from Reference Example 1 were mixed with enough diluent to make the final composition 7% by weight diluent. Diluent volatility, viscosity, and volume resistivity were determined as described above. Results are reported in Table 1. Isosol® 400 K is a light liquid isoparrafin solvent having a boiling point ranging from 206° to 257° C. available from Nippon Sekiyu K. K. Chem. Co. Ltd. Isopar® G is a light liquid C 10–11 isoparrafin solvent having a boiling point ranging from 157° to 176° C. available from Exxon Corporation. Ervol® is a white mineral oil having a viscosity of 24 to 26 $mm^2/s$ (1 $mm^2/s$=1 centistoke) at 40° C. available from Witco Chemical Corporation, Sonneborn Division, Melrose Park, Ill. 60160). Drakeol® 21 is a mineral oil available from available from Penreco Corp. of Butler, Pa. In Table 1 hereinbelow, $D_5$ denotes decamethylcyclopentasiloxane which has a bp of about 211° C. and $D_6$ denotes dodecamethylcyclohexasiloxane and has a bp of about 245° C.

Comparative Examples 1 and 2

The following example shows the result of selecting a compatible diluent that volatilizes out of the composition before significant cure can occur under the cure conditions used for the evaluation. An aliquot of the composition from Reference Example 1 was mixed with enough hexane or xylene to make the final composition 7% by weight diluent. Diluent volatility, viscosity, and volume resistivity were determined as described above. Results are reported in Table 1 and denoted as examples C 1 and C2.

Comparative Example 3

The following example shows the result of selecting a compatible diluent that does not volatilize out of the composition. An aliquot of the composition from Reference Example 1 was mixed with enough trimethylsiloxy-terminated dimethylpolysiloxane having a viscosity 500 $mm^2/s$ (1 $mm^2/s$=1 centistoke), to make the final composition 7% by weight trimethylsiloxy-terminated dimethylpolysiloxane. Diluent volatility, viscosity, and volume resistivity were determined as described above. Results are reported in Table 1 and denoted as example C3.

Comparative Example 4

The following example shows the result of selecting a compatible diluent that does not volatilize out of the composition but instead is incorporated into the matrix during cure. An aliquot of the composition from Reference Example 1 was mixed with enough vinyldimethylsiloxy-terminated dimethylpolysiloxane having an average degree of polymerization of 150, to make the final composition 7% by weight vinyldimethylsiloxy-terminated dimethylpolysiloxane. Diluent volatility, viscosity, and volume resistivity were determined as described above. Results are reported in Table 1 and denoted as example C4.

Comparative Example 5

The following example shows the result of selecting a diluent that can volatilize out of the composition but has poor compatibility with the matrix. The diluent tested in this example was shown to lower permanent compression set and increase elastic resilience in example 3 of U.S. Pat. No. 5,229,037 while not having an effect on volume resistivity. An aliquot of the composition from Reference Example 1 was mixed with enough hydroxy terminated poly-3,3,3-trifluoropropylmethylsiloxane having an average degree of polymerization of 4, to make the final composition 7% by weight hydroxy terminated poly-3,3,3-trifluoropropylmethylsiloxane. Diluent volatility, viscosity, and volume resistivity were determined as described above. Results are reported in Table 1 and denoted as example C5. The hydroxy terminated poly-3,3,3-trifluoropropylmethylsiloxane was found to have a slightly negative impact on volume resistivity while providing a minimal decrease in viscosity.

TABLE 1

| Ex. | Diluent | Diluent Volatility (% weight loss) | Viscosity at 25° C. (mPa · s) | Volume Resistivity* |
|---|---|---|---|---|
| 1 | No Diluent (control) | | 790000 | 1.64 ± 0.09 E-3 |
| 2 | Hexadecane (bp 287° C.) | 100 | 80000 | 1.91 ± 0.11 E-4 |
| 3 | Ervol ® | 61 | 72000 | 2.64 ± 0.86 E-4 |
| 4 | Isopar ® G | 101 | 112000 | 1.20 ± 0.07 E-3 |
| 5 | Drakeol ® 21 | 32 | 359000 | 2.36 ± 0.08 E-4 |
| 6 | Isosol ® 400K | 99 | 109000 | 7.87 ± 0.88 E-4 |
| 7 | 65:35 mixture of ($D_5$) and ($D_6$) | 100 | 116000 | 7.29 ± 0.49 E-4 |
| C1 | Hexane (bp 69° C.) | 100 | 167000 | 4.96 ± 0.57 E-3 |
| C2 | Xylenes | 99 | 85000 | 2.22 ± 0.19 E-3 |
| C3 | trimethylsiloxy-terminated polydimethylsiloxane | 0 | 91000 | >0.1 |
| C4 | vinyldimethylsiloxy-terminated dimethylpolysiloxane | 2 | 88000 | 3.11 ± 0.46 E-2 |
| C5 | hydroxy terminated poly-3,3,3-trifluoropropylmethylsiloxane | 89 | 434000 | 3.94 ± 1.04 E-3 |

*-Volume resistivity units are Ohm-cm ± standard deviation, cured samples were approximately 0.008 cm thick.

Reference Example 8

It may be desired to adjust the cure conditions, time and temperature, to meet specific application needs. One skilled in the art can select from a variety of hydrosilylation catalysts and inhibitors to allow composition of a 1 part material with desired pot life and cure conditions. The choices are broadened if a 2 part composition can be used. The following example demonstrates this concept. The following Components were mixed until uniform:

(a) 100 parts by weight of a mixture containing 69 percent by weight of a dimethylvinylsiloxy-terminated polydimethylsiloxane having a viscosity of 2000 mPa·s and 31 percent by weight of an organosiloxane resin consisting essentially of $Me_3SiO_{1/2}$ units, $Me_2ViSiO_{1/2}$ units, and $SiO_{4/2}$ units having a molar ratio of monovalent units to tetravalent units of 0.7:1, the mixture having a viscosity of 8,000 mPa·s at 25° C. and having a vinyl content of 0.8 percent by weight, (b) 8.2 parts by weight of $ViMe_2SiO(Me_2SiO)_3Si(OMe)_3$, (c) 1.4 parts by weight of trimethyl(3,5-dimethyl- 1-hexyn-3-oxy)silane, (d) 519.8 parts by weight of silver particulates having an average particle of size 6 microns, a surface area of 0.9 $m^2/g$, an apparent density of 2 $g/cm^3$, a tap density of 3 $g/cm^3$, (e) 26.8 parts by weight of crushed crosslinked silicone rubber particulates having, by sieve analysis, an average particle size of approximately 25 microns with a maximum particle size less than 63 microns, (f) 13.2 parts by weight of a mixture containing a complex of platinum with 1,3-divinyl- 1,1,3,3-tetramethyldisiloxane diluted with dimethylvinylsilyl terminated polydimethylsiloxane, the mixture having a platinum content of about 0.5 percent by weight, (g) 4.9 parts by weight of a trimethylsiloxy-terminated methylhydrogenpolysiloxane having a viscosity of about 30 mPa·s at 25° C. having a hydrogen content of 1.6 percent by weight, Component (g) was added last to a premix of the above Components.

The composition was evaluated for volume resistivity using the procedure described above, except that only three specimens were evaluated after cure at 70° C. for 1 hour or after cure at 150° C. for 1 hour. Results are listed in Table 2.

Examples 9–10

It may be desired to adjust the cure conditions, time and temperature, to meet specific application needs. The choice of diluents which improve volume resistivity can be selected accordingly. Aliquots of the composition from Example 8 were mixed with enough diluent to make the final composition 7% by weight of the relatively high volatility diluents, xylenes and Isosol® 400 K. Volume resistivity was determined as in example 8. Results are reported in Table 2. The results indicate that Isosol® 400K, which was only mildly useful to enhance volume resistivity with the cure conditions of example 6, can be very useful after adjusting the composition for milder cure conditions. Similarly, the results listed in Table 2 for xylenes, indicate this diluent may be used to reduce volume resistivity if the cure conditions of a 1 part composition are very mild.

TABLE 2

| Ex. | Diluent | Volume Resistivity after 70° C. cure for 1 hr | Volume Resistivity after 150° C. cure at 1 hr |
|---|---|---|---|
| 8 | no diluent | 1.03 ± 0.09 E-2 | 3.23 ± 0.34 E-3 |
| 9 | Xylenes | 7.92 ± 0.43 E-3 | 3.28 ± 0.36 E-3 |
| 10 | Isosol 400K | 2.80 ± 0.34 E-4 | 1.44 ± 0.05 E-4 |

Volume resistivity units are Ohm-cm ± standard deviation, cured samples were approximately 0.008 cm thick.

Example 11

A series of compositions were made to show the effects of varied amounts of silver, diluent, rubber particulates amount, and size upon volume resistivity, Young's modulus, and viscosity. The composition of Reference Example 1 was used except without the crushed rubber particulates as the base composition. The base composition was prepared with the amounts of silver listed in Table 3. To the base composition was added Isosol® 400K (diluent) and/or rubber particulates in the quantities listed in Table 3. The crushed rubber particulates used were a crosslinked dimethylpolysiloxane, which by sieve analysis, have an average particle size of approximately 100 microns with a maximum particle size of less than 250 microns. The spherical rubber particulates used were a crosslinked polydimethylsiloxane having an average particle diameter of approximately 3 microns with a maximum particle size of less than approximately 20 microns. Volume resistivity and viscosity were measured as described above, except that specimens for volume resistivity without rubber particulates were prepared at a thickness of approximately 0.05 mm while those with rubber particulates were prepared at a thickness of approximately 0.3 mm to accommodate the rubber particulates.

The results listed in Table 3 indicate that volume resistivity depends upon the amount of silver present (A and B). Upon adding rubber particulates (F and G), modulus is reduced while volume resistivity either remains the same (G), or is increased slightly (F). Control of modulus is desirable to meet certain application needs. Unfortunately adding rubber particulates can increase the viscosity of the uncured composition to the point of making the material unmanageable, (G). Addition of diluent lowers the viscosity and volume resistivity while increasing modulus (C). The modulus can be readjusted downward by addition of rubber particulates, with minimal detrimental effect on volume resistivity, (D and E). It should be noted that addition of either rubber particulates or diluent lowers the silver content of the composition, both desired from a cost perspective. Through judicious choice of amounts of diluent and rubber particulates a wide range of properties can be achieved.

(d) 375 parts by weight of silver particulates having an average particle size 7 microns, a surface area of 0.7 $m^2/g$, an apparent density of 2.5 $g/cm^3$, and a tap density of 4 $g/cm^3$, (e) 6 parts by weight of a mixture containing (i) 40 percent by weight of a complex of platinum with 1,3-divinyl-1,1,3,3 tetramethyldisiloxane dispersed in a thermoplastic silicone resin having a softening point of from 80–90° C. and reduced to fine particles (ii) 52 percent by weight of a dimethylvinylsiloxy-terminated dimethylpolysiloxane having a viscosity 2000 mPa·s at 25° C. having a vinyl content of 0.2 percent by weight, (iii) 8 percent by weight of hydrophobic silica, the mixture having a platinum content of about 0.9 percent by weight, and (f) 4.6 parts by weight of trimethylsiloxy-terminated methylhydrogenpolysiloxane having a viscosity 30 mPa·s at 25° C. having a hydrogen content of 1.6 percent by weight.

To the above composition, was then added 25 or 50 parts by weight of Isosol® 400K (diluent) and/or spherical rubber particulates as described in Example 11. Samples for volume resistivity were drawn down and cured for 1 hour at 150° C. The volume resistivity measurement was made on the cured sample with an apparatus identified as a Model K-705RL manufactured by Kyowa Riken Co. The experimental results are summarized in Table 4.

TABLE 4

| Sample | Parts by Wt. of Isosol ® 400K | Parts by Wt. of Sperical Rubber particulates | Wt. % Ag content, as supplied (Wt. % Ag after cure) | Volume Resistivity |
| --- | --- | --- | --- | --- |
| A | 0 | 0 | 75% (75%) | 7.1 E-1 |
| B | 25 | 0 | 71.4 (75) | 6.8 E-3 |

TABLE 3

| Sample | Wt % Silver in Base Comp. | Wt % Isosol 400K | Wt % Rubber Powder | Viscosity @ 25° C. (shear rate 1 $sec^{-1}$) | Young's Modulus | Volume Resistivity (ohm-cm ± standard deviation) |
| --- | --- | --- | --- | --- | --- | --- |
| A | 79 | 0 | 0 | 260,000 cP | 6,000 psi | 4.23 ± 0.66 E-3 |
| B | 80 | 0 | 0 | 315,000 | 6,000 | 1.26 ± 0.20 E-3 |
| C | 80 | 5 | 0 | 70,000 | 13,000 | 2.14 ± 0.24 E-4 |
| D | 80 | 5 | 4 (crushed) | 180,000 | 7,000 | 3.04 ± 0.23 E-4 |
| E | 80 | 5 | 4 (spherical) | 370,000 | 7,000 | 2.97 ± 0.18 E-4 |
| F | 80 | 0 | 4 (crushed) | 755,000 | 4,000 | 7.33 ± 1.34 E-3 |
| G | 80 | 0 | 4 (spherical) | >1,600,000 | * | 1.30 ± 0.12 E-3 |

*-draw downs for modulus determination could not be made because of viscosity.

Example 12

A base composition was prepared by mixing the following Components to uniformity:

(a) 107.4 parts by weight of a mixture containing 69 percent by weight of a dimethylvinylsiloxy-terminated polydimethylsiloxane having a viscosity of 2000 mPa·s and 31 percent by weight of an organosiloxane resin consisting essentially of $Me_3SiO_{1/2}$ units, $Me_2ViSiO_{1/2}$ units, and $SiO_{4/2}$ units having a molar ratio of monovalent units to tetravalent units of 0.7: 1, the mixture having a viscosity of 8,000 mPa·s at 25° C. and having a vinyl content of 0.8 percent by weight, (b) 3.5 parts by weight of $ViMe_2SiO(Me_2SiO)_3Si(OMe)_3$.

(c) 3.5 parts by weight of a mixture containing 97 percent by weight of $ViMe_2SiO(Me_2SiO)_3Si(OMe)_3$ and 3 percent by weight of 2-phenyl-3-butyn-2-ol, TABLE 4-continued

| Sample | Parts by Wt. of Isosol ® 400K | Parts by Wt. of Sperical Rubber particulates | Wt. % Ag content, as supplied (Wt. % Ag after cure) | Volume Resistivity |
| --- | --- | --- | --- | --- |
| C | 50 | 0 | 68.2 (75) | 1.0 E-3 |
| D | 0 | 25 | 71.4 (71.4) | 8.2 E-3 |
| E | 25 | 25 | 68.2 (71.4) | 3.3 E-3 |
| F | 50 | 25 | 65.2 (71.4) | 1.7 E-3 |
| G | 0 | 50 | 68.2 (68.2) | 5.6 E-3 |
| H | 25 | 50 | 65.2 (68.2) | 3.9 E-3 |
| I | 50 | 50 | 62.5 (68.2) | 2.9 E-3 |

Volume resistivity units are Ohm-cm

Example 13

A base composition was prepared by mixing the following Components to uniformity:

(a) 72.3 parts by weight of a mixture containing 64 percent by weight of a dimethylvinylsiloxy-terminated polydimethylsiloxane having a viscosity of about 430 mPa·s at 25° C. and 36 percent by weight of an organosiloxane resin consisting essentially of $Me_3SiO_{1/2}$ units, $Me_2ViSiO_{1/2}$ units, and $SiO_{4/2}$ units having a molar ratio of monovalent units to tetravalent units of 0.7:1, the mixture having a vinyl content of 1 percent by weight, (b) 100 parts by weight of a dimethylvinylsiloxy-terminated polydimethylsiloxane having a viscosity of 450 mPa·s at 25° C. and a vinyl content of 0.46 percent by weight, (c) 8.4 parts by weight of $ViMe_2SiO(Me_2SiO)_3Si(OMe)_3$.

(d) 8.4 parts by weight of a mixture containing 97 percent by weight of $ViMe_2SiO(Me_2SiO)_3Si(OMe)_3$ and 3 by weight of 2-phenyl-3-butyn-2-ol, (e) 963.9 parts by weight of silver particulates having an average particle size 6 microns, a surface area of 0.9 $m^2/g$, an apparent density of 2 $g/cm^3$, and a tap density of 3 $g/cm^3$, (f) 26.5 parts by weight of a mixture containing 80 percent by weight of a dimethylvinylsiloxy-terminated polydimethylsiloxane having a viscosity of 2,000 mPa·s at 25° C. and a vinyl content of 0.21 percent by weight and 20 percent by weight of hydrophobic fumed silica, (g) 14.5 parts by weight of a mixture containing (i) 40 percent by weight of a complex of platinum with 1,3-divinyl-1,1,3,3 tetramethyldisiloxane dispersed in a thermoplastic silicone resin having a softening point of from 80–90° C. and pulverized to fine particles (ii) 52 percent by weight of a dimethylvinylsiloxy-terminated dimethylpolysiloxane having a viscosity 2000 mPa·s at 25° C. having a vinyl content of 0.2 percent by weight, (iii) 8 percent by weight of hydrophobic silica, the mixture having a platinum content of about 0.9 percent by weight, and (f) 10.8 parts by weight of trimethylsiloxy-terminated methylhydrogenpolysiloxane having a viscosity 30 mPa·s at 25° C. having a hydrogen content of 1.6 percent by weight.

To the above composition was then added 2% by weight of a diluent denoted in Table 5. The samples were then cured by heating at 120° C. for 30 minutes followed by heating at 150° C. for 1 hour, the specimens were 0.4 mm thick. Volume resistivity was measured as in Example 12. The experimental results are summarized in Table 5.

TABLE 5

| Sample | Diluent | Boiling Point (° C.) | Volume Resistivity* |
|---|---|---|---|
| A | none | — | 7 E-3 |
| B | Pentylbenzene | 189 | 5 E-4 |
| C | Cyclohexylbenzene | 238 | 5 E-4 |
| D | Diethyl phthalate | 295 | 5 E-4 |
| E | n-Hexane | 69 | 1 E-3 |
| F | n-Decane | 174 | 5 E-4 |
| G | n-Pentadecane | 271 | 5 E-4 |
| H | Isosol 400K | 206–257 | 5 E-4 |

*-Volume resistivity units are Ohm-cm

That which is claimed is:

1. An electrically conductive silicone composition comprising:

(A) at least one organopolysiloxane containing at least two alkenyl groups per molecule;

(B) at least one organohydrogenpolysiloxane having at least two silicon-bonded hydrogen atoms per molecule;

(C) a platinum group metal-containing catalyst;

(D) at least one electrically conductive metal particulate;

(E) precrosslinked elastomeric silicone particles; and (F) at least one non-reactive volatile compatible diluent.

2. A composition according to claim 1, wherein (A) is selected from the group consisting of trimethylsiloxy-terminated dimethylpolysiloxane-methylvinylpolysiloxane copolymers, vinyldimethylsiloxy-terminated dimethylpolysiloxanes, vinyldimethylsiloxy-terminated dimethylpolysiloxane-methylvinylpolysiloxane copolymers, trimethylsiloxy-terminated dimethylpolysiloxane-methylhexenylpolysiloxane copolymers, hexenyldimethylsiloxy-terminated dimethylpolysiloxanes, hexenyldimethylsiloxy-terminated dimethylpolysiloxane-methylhexenylpolysiloxane copolymers, trimethylsiloxy-terminated dimethylsiloxane-methylvinylsiloxane-methylphenylsiloxane copolymers, vinyldimethylsiloxy-terminated dimethylsiloxane-methylvinylsiloxane-methylphenylsiloxane copolymers, vinyldimethylsiloxy-terminated dimethylsiloxane-methylphenylsiloxane copolymers, vinyldimethylsiloxy-terminated dimethylsiloxane-diphenylsiloxane copolymers, trimethylsiloxy-terminated dimethylsiloxane-methylvinylsiloxane-diphenylsiloxane copolymers, trimethylsiloxy-terminated dimethylsiloxane-methylhexenylsiloxane-methylphenylsiloxane copolymers, hexenyldimethylsiloxy-terminated dimethylsiloxane-methylhexenylsiloxane-methylphenylsiloxane copolymers, hexenyldimethylsiloxy-terminated dimethylsiloxane-methylphenylsiloxane copolymers, hexenyldimethylsiloxy-terminated dimethylsiloxane-diphenylsiloxane copolymers, trimethylsiloxy-terminated dimethylsiloxane-methylhexenylsiloxane-diphenylsiloxane copolymers, and combinations thereof.

3. A composition according to claim 1, wherein (B) is selected from the group consisting of dimethylhydrogensiloxy-terminated dimethylpolysiloxanes, dimethylhydrogensiloxy-terminated methylhydrogenpolysiloxanes, dimethylhydrogensiloxy-terminated dimethylpolysiloxane-methylhydrogenpolysiloxane copolymers, trimethylsiloxy-terminated dimethylpolysiloxane-methylhydrogenpolysiloxane copolymers, trimethylsiloxy-terminated methylhydrogenpolysiloxanes, $PrSi(OSiMe_2H)_3$ Pr denotes propyl and me denotes methyl, cyclic methylhydrogensiloxanes, and siloxane resin copolymers consisting essentially of $Me_2HSiO_{1/2}$ units and $SiO_2$ units.

4. A composition according to claim 1, wherein (C) is selected from the group consisting of chloroplatinic acid, alcohol modified chloroplatinic acids, and olefin complexes of platinum.

5. A composition according to claim 1, wherein (C) is a microencapsulated platinum-containing catalyst comprising microparticles of a thermoplastic resin containing an encapsulated hydrosilylation reaction catalyst obtained by a method comprising:

(i) dissolving a hydrosilylation catalyst and a thermoplastic resin in a quantity of a volatilizable liquid sufficient to achieve a solution exhibiting a viscosity suitable for spraying, where the softening point or glass-transition temperature of the resin is from 40 to 200° C.;

(ii) blending the solution in the form of a spray into a current of a heated inert gas, whereby the liquid is volatilized from the individual droplets that constitute the spray concurrently with solidification of the resin to form discrete microparticles during entrainment of the droplets in the current; and (iii) recovering the microparticles.

6. A composition according to claim 5, wherein the hydrosilylation catalyst is selected from the group consisting of chloroplatinic acid, alcohol-modified chloroplatinic acids, and olefin complexes of platinum.

7. A composition according to claim 5, wherein the thermoplastic resin is selected from the group consisting of silicone resins, polysilane resins, acrylic resins, polystyrene resins, and methyl cellulose.

8. A composition according to claim 1, wherein (D) is selected from the group consisting of silver powders, silver flakes, and a mixture of silver powders and silver flakes.

9. A composition according to claim 1, wherein (E) comprises spherical particles of precrosslinked silicone elastomer.

10. A composition according to claim 1, wherein (E) comprises irregular shaped particles of precrosslinked silicone elastomer.

11. A composition according to claim 1, wherein (F) is selected from the group consisting of cyclic saturated hydrocarbons, straight-chain saturated hydrocarbons, isoparaffins, mineral oils, aromatic hydrocarbons, alkyl substituted aromatic hydrocarbons, ethers, esters, low molecular weight polysiloxanes, and cyclic low molecular weight polysiloxanes.

12. A composition according to claim 1, wherein (F) is selected from the group consisting of hexadecane, mineral oil, isoparaffins, decamethylcyclopentasiloxane, dodecamethylcyclohexasiloxane, xylene, pentylbenzene, cyclohexylbenzene, diethyl phthalate, decane, pentadecane, and a mixture of decamethylcyclopentasiloxane and dodecamethylcyclohexasiloxane.

13. A composition according to claim 1, wherein the composition further comprises a siloxane resin consisting essentially of at least one $R_3SiO_{1/2}$ (M) unit and at least one $SiO_{4/2}$ (Q) unit wherein R is independently selected from the group consisting of a monovalent hydrocarbon group free of aliphatic unsaturation having from 1 to 10 carbon atoms and an alkenyl group having from 2 to 10 carbon atoms.

14. A composition according to claim 1, wherein the composition fturther comprises an inhibitor.

15. A composition according to claim 13, wherein the composition further comprises an inhibitor.

16. A composition according to claim 1, wherein the composition further comprises an adhesion promoter.

17. A composition according to claim 13, wherein the composition further comprises an adhesion promoter.

18. A composition according to claim 14, wherein the composition further comprises an adhesion promoter.

19. A composition according to claim 15, wherein the composition further comprises an adhesion promoter.

20. An electrically conductive silicone composition obtained by a method comprising reacting a mixture comprising:

(A) at least one organopolysiloxane containing at least two alkenyl groups per molecule;

(B) at least one organohydrogenpolysiloxane having at least two silicon-bonded hydrogen atoms per molecule;

(C) a platinum group metal-containing catalyst;

(D) an electrically conductive metal particulate;

(E) a precrosslinked elastomeric silicone particle; and (F) a non-reactive volatile compatible diluent.

21. A composition according to claim 20, wherein the mixture further comprises a siloxane resin consisting essentially of at least one $R_3SiO_{1/2}$ (M) unit and at least one $SiO_{4/2}$ (Q) unit wherein R is independently selected from the group consisting of a monovalent hydrocarbon group free of aliphatic unsaturation having from 1 to 10 carbon atoms and an alkenyl group having from 2 to 10 carbon atoms.

22. A composition according to claim 20, wherein the mixture further comprises an inhibitor.

23. A composition according to claim 21, wherein the mixture further comprises an inhibitor.

24. A composition according to claim 20, wherein the mixture further comprises an adhesion promoter.

25. A composition according to claim 21, wherein the mixture further comprises an adhesion promoter.

26. A composition according to claim 22, wherein the mixture further comprises an adhesion promoter.

27. A composition according to claim 23, wherein the mixture further comprises an adhesion promoter.

28. An article of manufacture obtained by a method comprising (I) applying an electrically conductive silicone composition on the surface of a substrate wherein the electrically conductive silicone composition comprises:

(A) at least one organopolysiloxane containing at least two alkenyl groups per molecule;

(B) at least one organohydrogenpolysiloxane having at least two silicon-bonded hydrogen atoms per molecule;

(C) a platinum group metal-containing catalyst;

(D) an electrically conductive metal particulate;

(E) a precrosslinked elastomeric silicone particle; and (F) a none-reactive volatile compatible diluent.

29. An article of manufacture according to claim 28, wherein the method further comprises (II) exposing the coating and the substrate to heat in an amount sufficient to cure the coating.

* * * * *